(12) United States Patent
Nagayama

(10) Patent No.: US 7,731,464 B2
(45) Date of Patent: Jun. 8, 2010

(54) INSERT NUT

(75) Inventor: Yutaka Nagayama, Kishiwada (JP)

(73) Assignee: Nagayama Electric Co., Ltd., Kishiwada-shi (JP)

( * ) Notice: Subject to any disclaimer, the term of this patent is extended or adjusted under 35 U.S.C. 154(b) by 0 days.

(21) Appl. No.: 12/236,010

(22) Filed: Sep. 23, 2008

(65) Prior Publication Data
US 2009/0080998 A1  Mar. 26, 2009

(30) Foreign Application Priority Data
Sep. 26, 2007   (JP)  ............................. 2007/248957

(51) Int. Cl.
*F16B 37/12* (2006.01)
(52) U.S. Cl. ...................... 411/178; 411/903
(58) Field of Classification Search ............... 411/178, 411/197, 902, 903, 108, 172, 174, 432, 437; 29/512, 522.1, 523
See application file for complete search history.

(56) References Cited

U.S. PATENT DOCUMENTS

| 2,984,279 | A | * | 5/1961 | Rosan | 411/178 |
| 3,319,690 | A | * | 5/1967 | Rosan et al. | 411/178 |
| 3,405,591 | A | * | 10/1968 | Neuschotz | 411/416 |
| 3,754,731 | A | * | 8/1973 | Mackal et al. | 251/145 |
| 5,071,299 | A | * | 12/1991 | Sekine et al. | 411/183 |
| 5,297,851 | A | * | 3/1994 | Van Hekken | 297/452.14 |
| 5,435,678 | A | * | 7/1995 | Stencel | 411/178 |
| 5,860,779 | A | * | 1/1999 | Toosky et al. | 411/432 |
| 7,465,136 | B2 | * | 12/2008 | Nagayama | 411/178 |

FOREIGN PATENT DOCUMENTS

JP   2004211778 A   7/2004

* cited by examiner

*Primary Examiner*—Gary Estremsky
(74) *Attorney, Agent, or Firm*—Westerman, Hattori, Daniels & Adrian, LLP

(57) ABSTRACT

There is provided an insert nut, having an outer hollow portion made of a resin material and an inner hollow portion made of a metal material. The outer hollow portion has a projection functioning as a male screw or wedge formed on an outer surface thereof. The inner hollow portion has a female screw formed on an inner surface thereof. The inner hollow portion is press-fitted to the outer hollow portion by inserting one end of the inner hollow portion into the outer hollow portion to reach a final position. Further insertion of the inner hollow portion is prevented beyond the final position. Said one end of the inner hollow portion is caulked with the outer hollow portion.

5 Claims, 11 Drawing Sheets (a)

(b)

(c)

(a)

(b)

30

(a)

33
32

(b)

30  32
31
33

Prior Art

INSERT NUT

TECHNICAL FIELD

The present invention relates to an insert nut.

RELATED ART

FIG. 12(a) illustrates a perspective view of a conventional insert nut 30, and FIG. 12(b) illustrates a cross-sectional view along with the axis thereof. The insert nut is fitted into a fixing hole formed on a fixed material, such as a table board, in order to attach e.g., a leg. As illustrated in FIG. 12, this insert nut 30 has a female screw 31 formed on its inner surface of the hollow portion. The projections 32, functioning as a male screw, are spirally formed. An engaging hole 33 is formed in order to be engaged with a wrench for rotating the insert nut 30. This is made by a zinc die-cast material.

A zinc die-cast material increases the cost of the insert nut though it provides reliability in the strength.

The replacement of the metal material with a resin material would be beneficial to reduce the production cost and the weight of the product.

However, the insert nut made of a resin alone is not reliable in the strength.

Also, an engaging hole (hexagonal hole), if it is made of a resin material, may be deformed when rotating the insert nut by using a wrench.

Therefore, an insert nut may be made by a resin material alone, but it would have a problem in the reliability due to less strength.

JP laid-open patent publication No. 2004-211778 discloses an insert nut having a dual structure. The dual structure includes an inner hollow portion made of a metal material, and an outer hollow portion made of a resin material.

The insert nut as disclosed in JP laid-open patent publication No. 2004-211778 may solve the problems as explained above.

However, the process to produce such an insert nut includes a step of covering a cylinder made of a metal material with a resin material. This process is not efficient in the productivity, thereby increasing the cost.

Another approach to produce a dual structure is to separately provide an outer hollow portion and an inner hollow portion, followed by assembling together by press-fitting.

However, if producing a downsized insert nut, the outer hollow portion, having a thin resin part, can be broken at the time of the press-fitting.

Therefore, in order to avoid such breakage, it is necessary to consider that the inner hollow portion can be press-fitted at a low pressure. However, this consideration may result in loose attachment of the inner hollow portion with the outer hollow portion.

When the inner hollow portion is biased from the outer hollow portion, a leg, even after being fixed on the table by a bolt, can be released from the table.

SUMMARY OF THE INVENTION

Thus, the objective of the present invention is to produce an insert nut having a dual structure, in which an inner hollow portion and an outer hollow portion are press-fitted. In particular, the present invention can produce a downsized insert nut.

As a first aspect of the present invention, there is provided an insert nut, comprising: an outer hollow portion made of a resin material, having a projection functioning as a male screw or wedge formed on an outer surface thereof, and an inner hollow portion made of a metal material, having a female screw formed on an inner surface thereof. The inner hollow portion is press-fitted to the outer hollow portion by inserting one end of the inner hollow portion into the outer hollow portion to reach a final position. The inner hollow portion is prevented from being further inserted beyond the final position. One end of the inner hollow portion is caulked with the outer hollow portion.

In the present invention, the term "male screw" used in connection with the projection formed on the outer surface of the insert nut includes a male screw having a continuous thread, as well as one having discontinuous threads as illustrated in FIG. 1.

The term "wedge" used in connection with the projection formed on the outer surface of the insert nut means ones which function as a wedge when an insert nut is fitted into a hole formed on a fixed material such as table board.

In the present invention, the final position can be determined by stepped portions formed on the inner hollow portion and the outer hollow portion, one being engaged with the other. Alternatively the final position can be determined by inverted cone structures formed on the inner hollow portion and the outer hollow portion, one being engaged with the other.

As later described in detain, a disordered portion can be formed on the female screw.

According to the present invention, a relative movement between the inner hollow portion and the outer hollow portion is prevented.

The present invention is described more in detail with reference to the drawings.

FIRST EMBODIMENT

Figure 1:
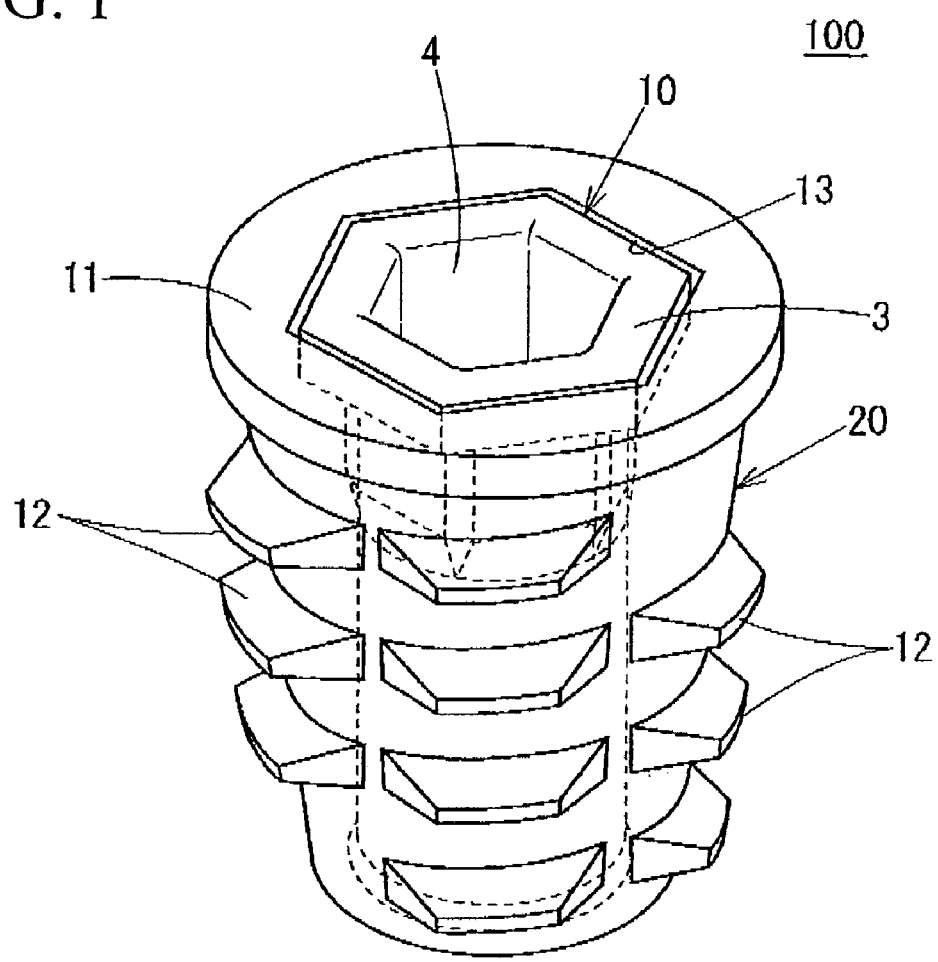
FIG. 1 illustrates a perspective view of an insert t-nut of the first embodiment.
Figure 2:
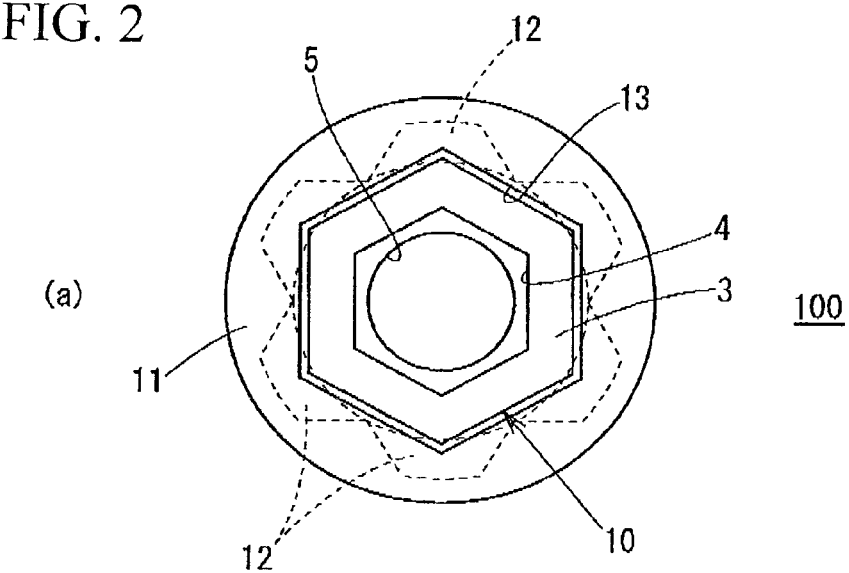
FIG. 2(a) illustrates a plan view of the embodiment shown in FIG. 1.
FIG. 2(b) illustrates a front view thereof.
FIG. 2(c) illustrates a bottom view thereof.
Figure 2:
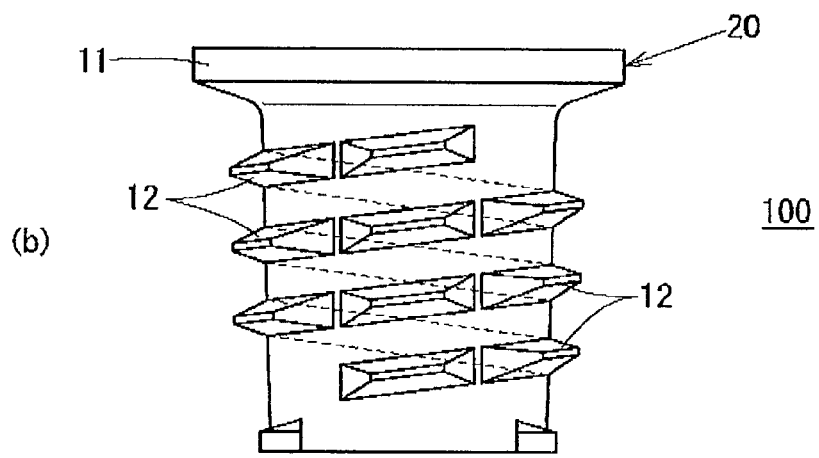
Figure 2:
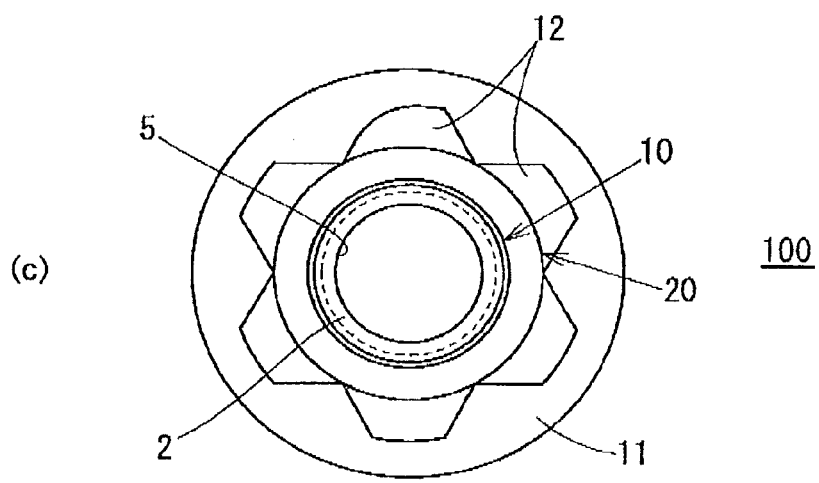

FIG. 1 illustrates a perspective view of an insert t-nut of the present invention 100. FIG. 2(a) illustrates a plane view, FIG.

Figure 3:
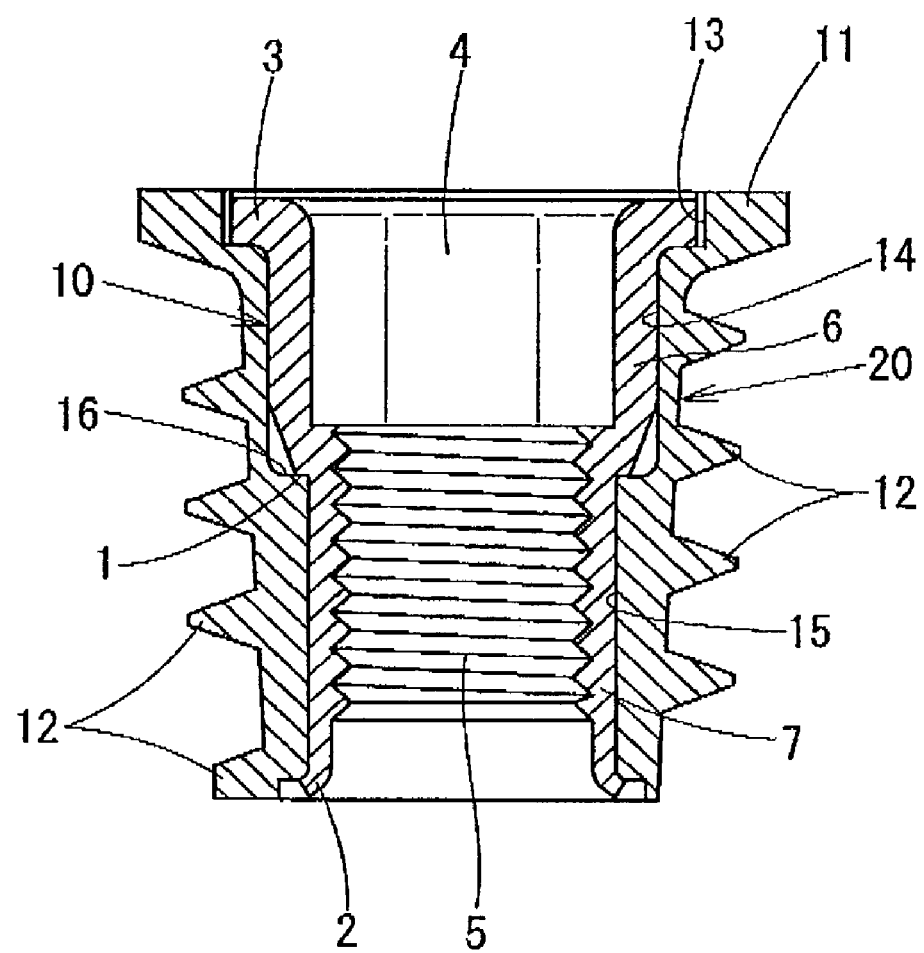
FIG. 3 illustrates a cross-sectional view of the embodiment shown in FIG. 2

2(b) illustrates a front view, and FIG. 2(c) illustrates a bottom view. FIG. 3 illustrates a cross-sectional view in the axial direction.

Figure 4:
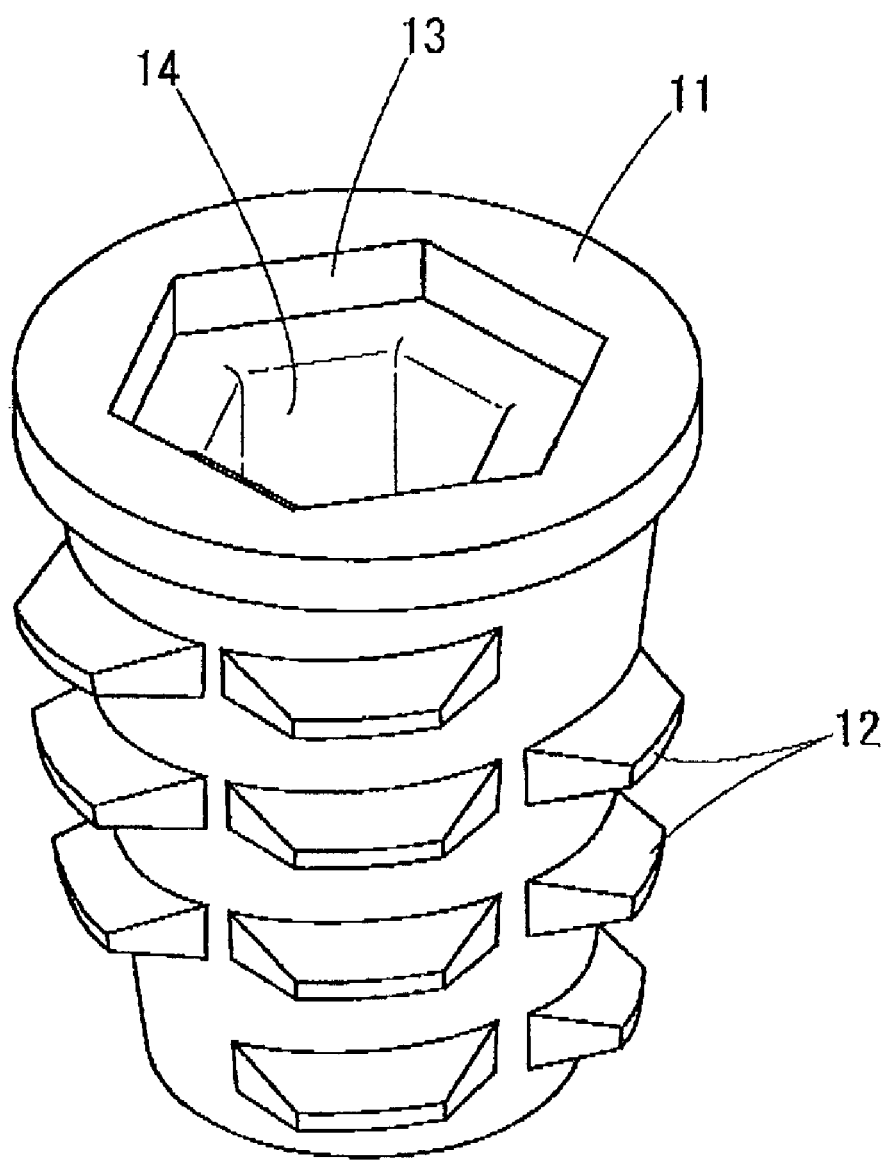
FIG. 4 illustrates a perspective view of the outer hollow portion of the embodiment alone.
Figure 5:
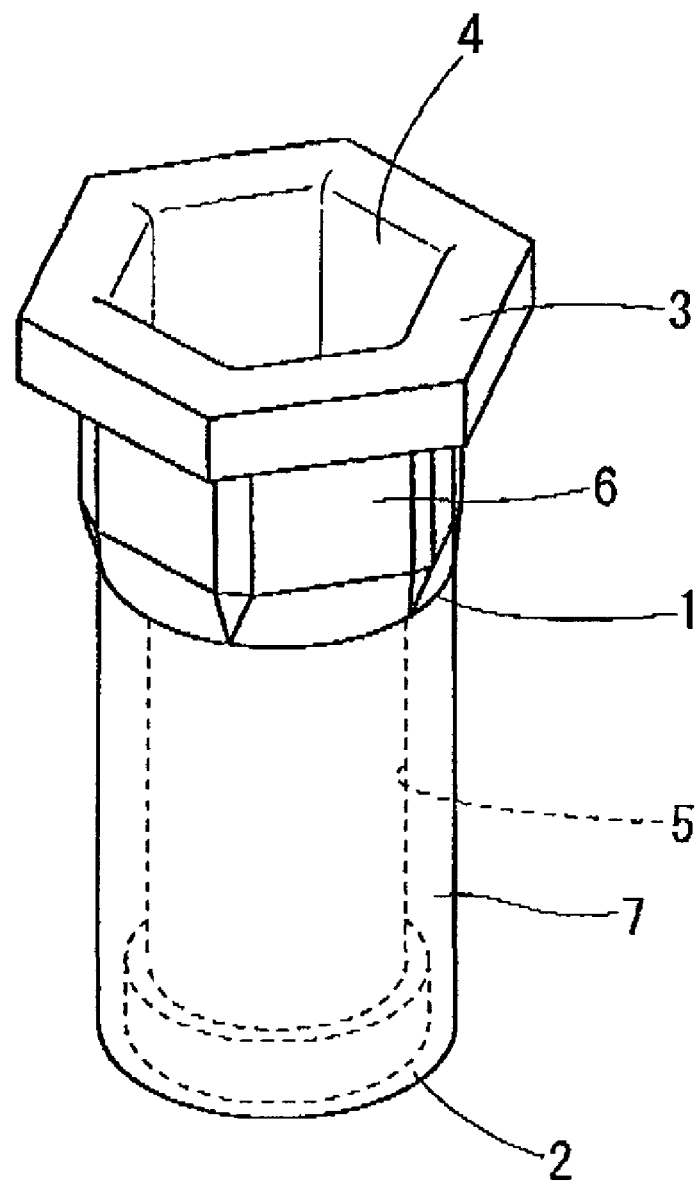
FIG. 5 illustrates a perspective view of the inner hollow portion of the embodiment alone.

The t-nut 100 has a dual structure. An inner hollow portion 10 is made by drawing a metal material, having open ends at both sides. An outer hollow portion 20 is made of a resin material such as polypropylene, having open ends at both sides. The outer hollow portion 20 is coaxially provided with the inner hollow portion 10. FIG. 4 illustrates a perspective view of the outer hollow portion 20 alone. FIG. 5 illustrates a perspective view of the inner hollow portion 10 alone. As described later, the inner hollow portion 10 is caulked at the lower end, that is, a to-be-caulked portion 2. The caulking is performed after inserting the inner hollow portion 10 into the outer hollow portion 20.

The outer hollow portion 20 has a sloped cylinder shape as illustrated in FIGS. 3 and 4. The outer diameter thereof is continuously decreased from the upper end to the lower end. The upper end has a flange 11 as illustrated in FIG. 3. On the outer surface thereof, a projection 12 is spirally formed. The projection 12 functions as a male screw when the t-nut 100 is fitted into a hole formed on a fixed material such as a table board.

The inner surface of the outer hollow portion 20 has a first hexagonal hole 13 extended over a predetermined depth, and a second hexagonal hole 14 extended from the first hexagonal hole 13. The second hexagonal hole 14 is smaller than the first hexagonal hole 13. Further, a round hole 15 is formed as extending from the second hexagonal hole 14. The round hole 15 is smaller than the second hexagonal hole 14. The inner surface of the outer hollow portion 20 has stepped parts 16 by the second hexagonal hole 14 and the round hole 15.

The outer surface of the inner hollow portion 10 has a first hexagonal flange part 3 which engages with the first hexagonal hole 13 of the outer hollow portion 20, a second hexagonal part 6 which engages with the second hexagonal hole 14 of the outer hollow portion 20, and a hollow part 7 which engage with the round hole 15 of the outer hollow portion 20. Thereby, a final position of the inner hollow portion can be determined. A female screw is formed on the inner surface of the hollow part 7, in which a male screw, a bolt is screwed.

A to-be-caulked portion 2 is formed at the lower end of the inner hollow portion 10. The area where the to-be-caulked portion is formed does not form a female screw. The to-be-caulked portion 2 has a small thickness in order to be easily caulked. After the inner hollow portion 10 is inserted into the outer hollow portion 20, the to-be-caulked portion 2 is caulked. The caulking process is performed by bending it outward in the radial direction of the inner hollow portion.

From the upper periphery of the second hexagonal part 6 of the inner hollow portion, a first hexagonal flange part 3 is extended, which is engaged with the first hexagonal hole 13 of the outer hollow portion 20.

The inner hollow portion 10 is inserted into the outer hollow portion 20 from the side where the to-be-caulked portion 2 is formed. At the final position, the upper end and lower end of the inner hollow portion 10 correspond to those of the outer hollow portion 20. Further insertion of the inner hollow portion 10 is restricted by e.g., the stepped portions 1, 16.

Thereby, a relative movement between the inner hollow portion 10 and the outer hollow portion 20 is prevented by the stepped portions 1, 16. The caulking at the to-be-caulked portion 2 also prevents the relative movement.

Also, a relative movement between the inner hollow portion 10 and the outer hollow portion 20 is prevented by the engagement of the second hexagonal part 6 with the second hexagonal hole 14 and by the engagement of the first hexagonal flange part 3 with the first hexagonal hole 13.

A hexagonal hole 4, formed at the upper end of the inner hollow portion, is engaged with a tool such as a hexagonal wrench.

The inner hollow portion 10 and the outer hollow portion 20, separately provided, are then assembled to form a t-nut of the present invention as explained below. See FIGS. 6(a) and 6(b).

Figure 6:
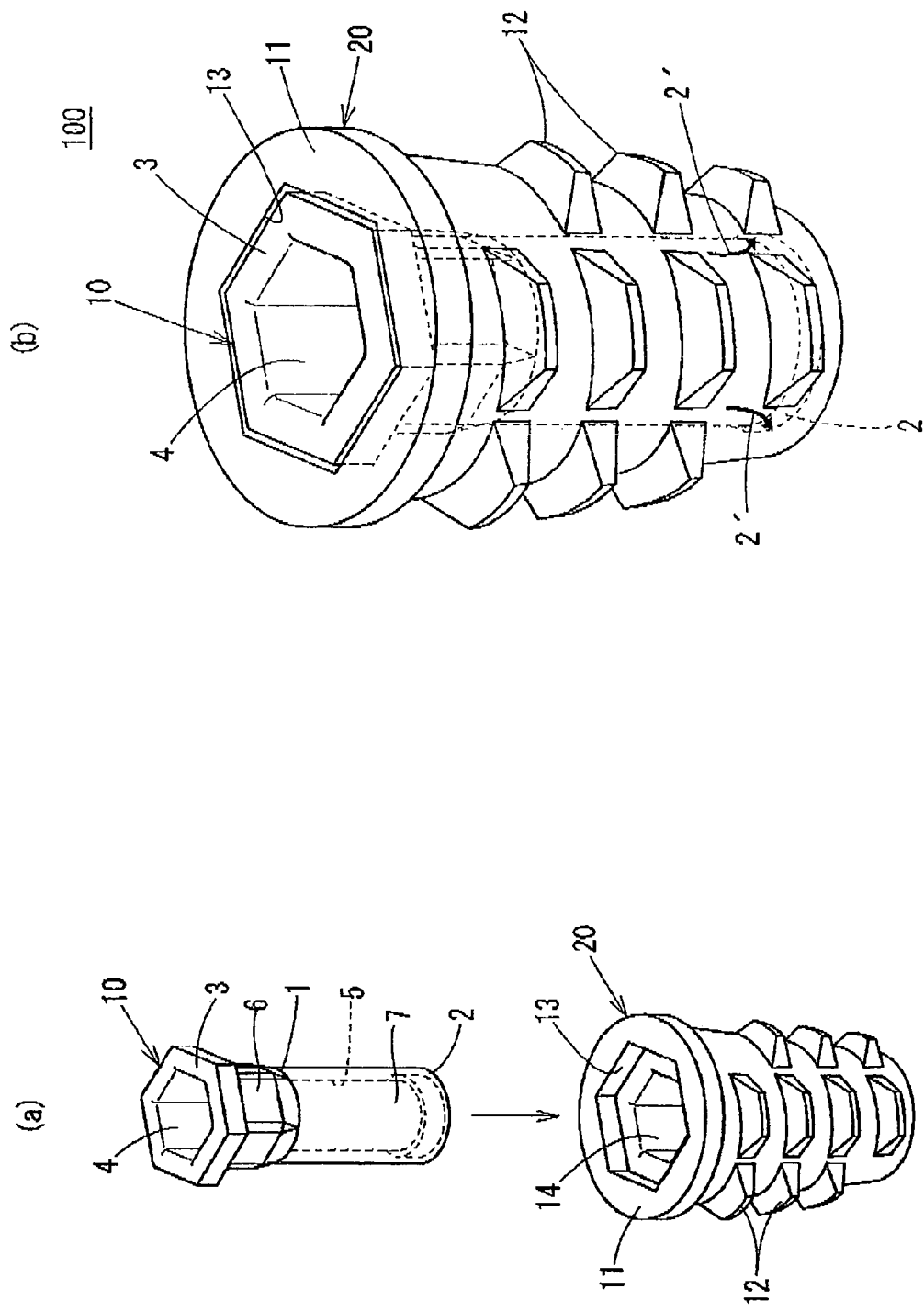
FIG. 6(a) illustrates a perspective view of a state in which the inner hollow portion is inserted into the outer hollow portion.
FIG. 6(b) illustrates a state in which the to-be-caulked portion of the inner hollow portion is caulked after the insertion.

As illustrated in FIG. 6(a), the lower end of the inner hollow portion 10 is inserted into the outer hollow portion 20. The insertion is done until the stepped portion 1 of the inner hollow portion 10 abuts the stepped portion 16 of the outer hollow portion 20.

After the insertion, the to-be-caulked portion 2 is caulked. As shown by arrow 2' in FIG. 6(b), the to-be-caulked portion 2 is caulked outward in the radial direction of the inner hollow portion. A relative movement can be prevented by the caulked portion and the stepped portions. The outer hollow portion is firmly held by the inner hollow portion.

As explained above, the present invention prevents a relative movement between the inner hollow portion 10 and the outer hollow portion 20. Thus, when the t-nut 100 is fitted to a fixed material such as a table board and then a bolt is screwed in the t-nut 100, any unintentional rotation or release of the inner hollow portion 10 from the outer hollow portion 20 can be avoided. Therefore, the bolt can be firmly fixed to the t-nut 100.

Figure 7:
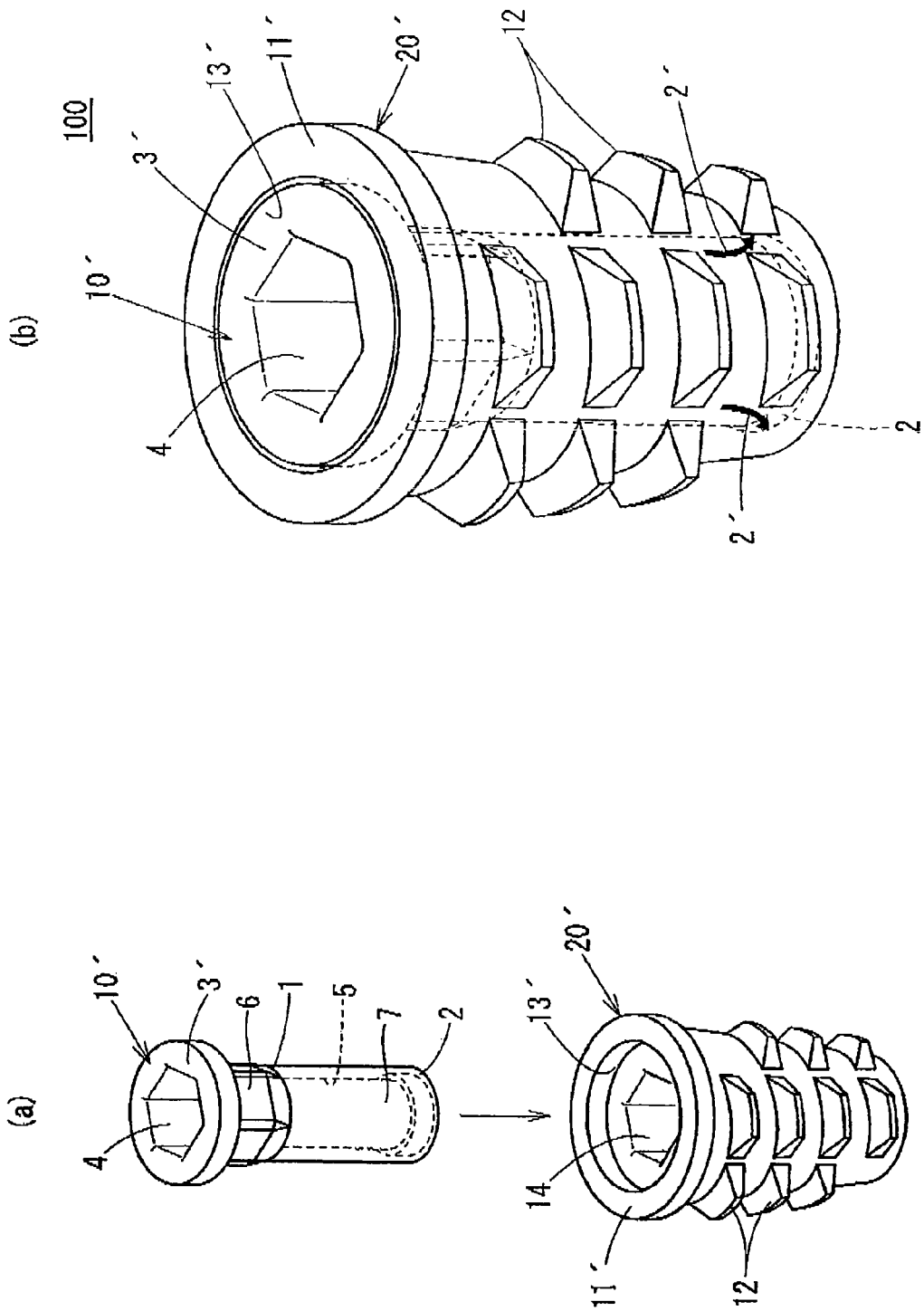
FIG. 7 illustrates a modification in which the shape of the flange of the inner hollow portion is replaced with a round shape.

FIG. 7 illustrates a modification of the first embodiment. In this modification, the flange 3 of the inner hollow portion 10' is round. The outer hollow portion has a hole corresponding to the round flange 3.

Figure 8:
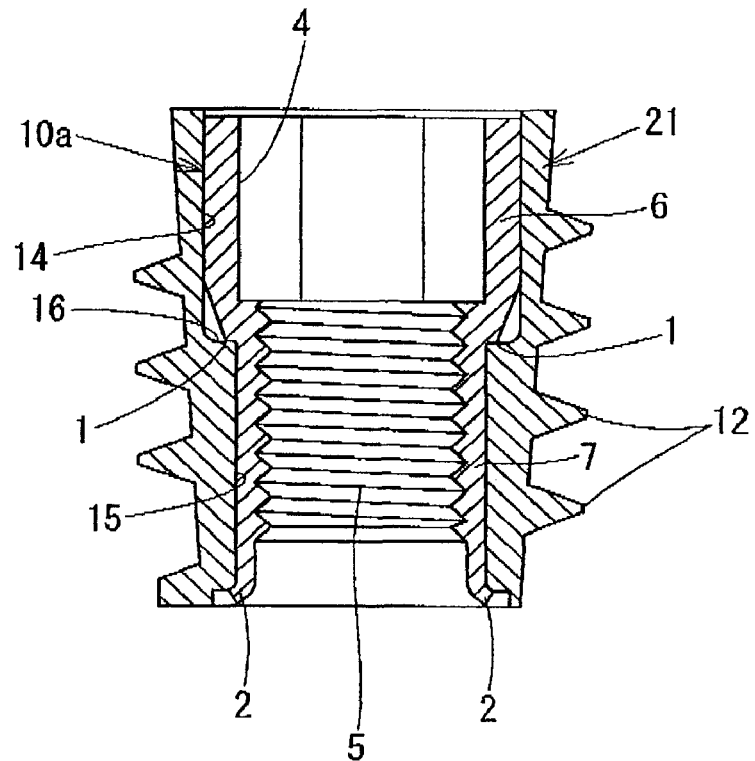
FIG. 8 illustrates a modification of the present invention.

FIG. 8 illustrates a cross-sectional view of another modification. This modification does not have a flange, so it is directed to an insert nut.

Figure 9:
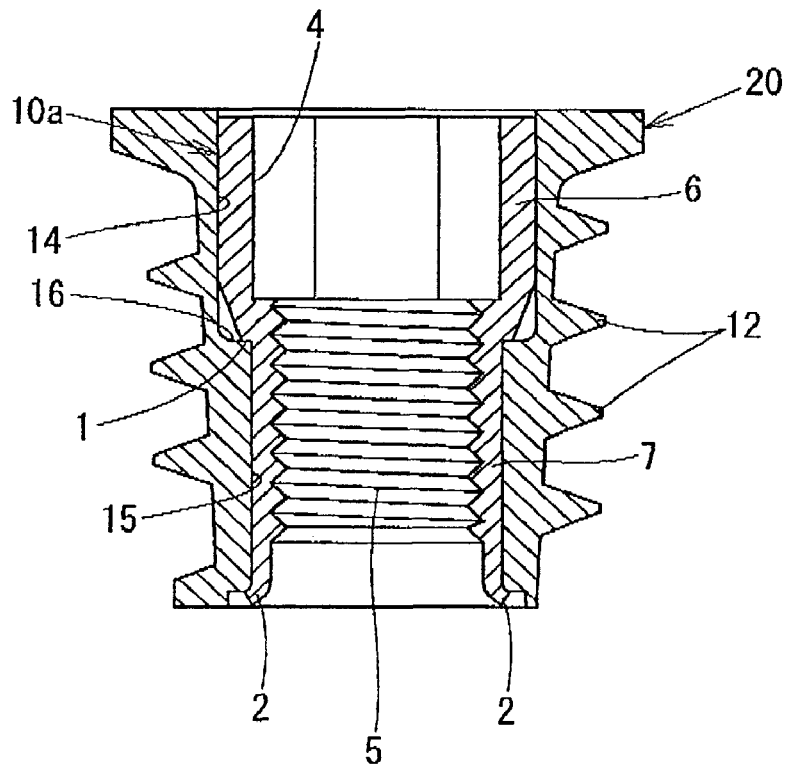
FIG. 9 illustrates a modification of the present invention.

FIG. 9 illustrates other modification 102. This modification 102 has a flange at the outer hollow portion 20, but does not have a flange at the inner hollow portion 10a.

The stepped portions 1, 16 and to-be-caulked portion 2 as illustrated in FIGS. 8 and 9 prevent the relative movement between the inner hollow portion and the outer hollow portion. The structure as illustrated in FIGS. 8 and 9 can simplify the structure of the metal molding.

SECOND EMBODIMENT

Figure 10:
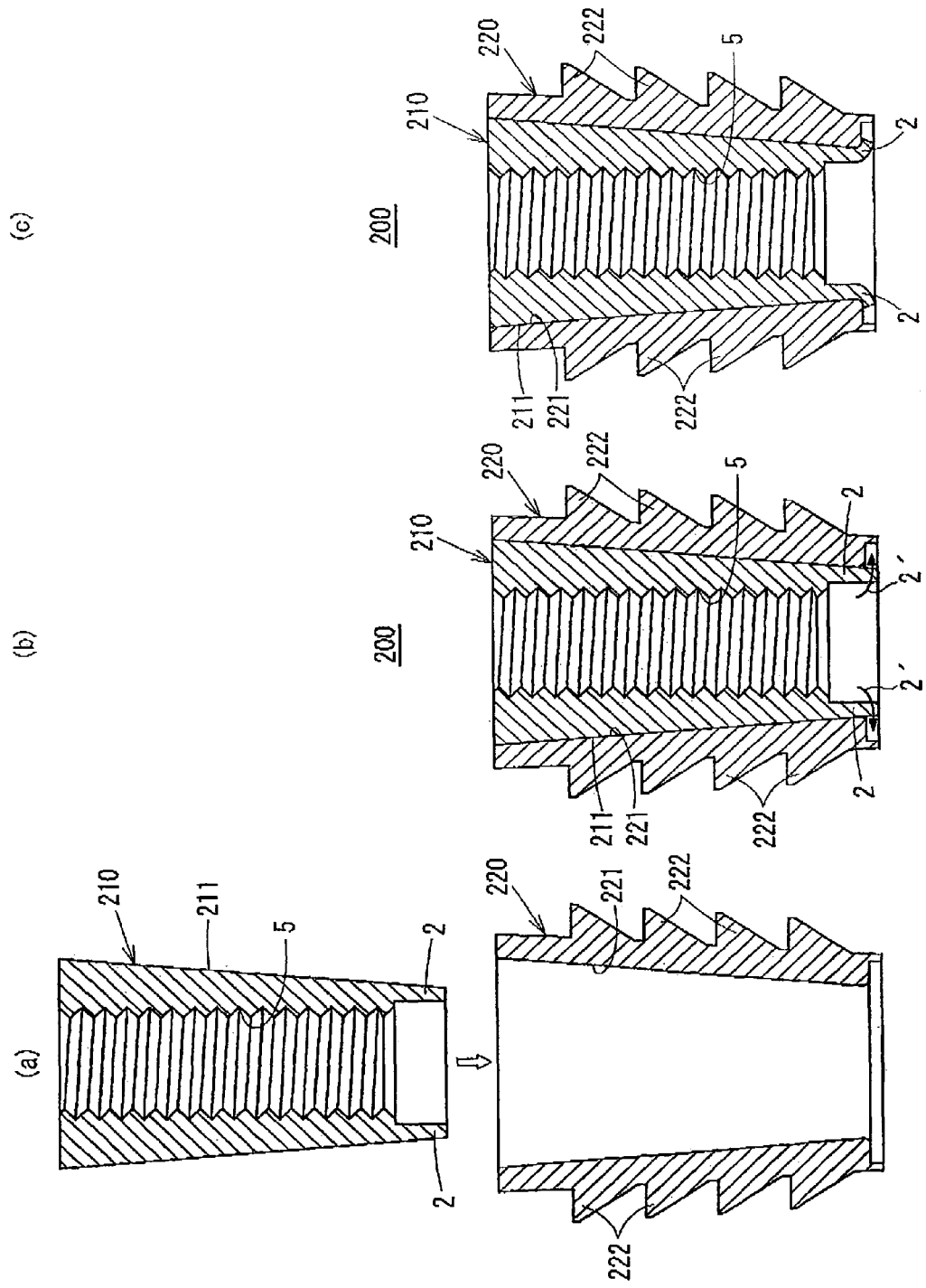
FIGS. 10(a)-(c) illustrate a structure of the second embodiment.

FIG. 10 illustrates an insert nut 200 as a second embodiment of the present invention. FIG. 10(a) separately illustrates an inner hollow portion 210 and an outer hollow portion 220; FIG. 10(b) illustrates a state where the inner hollow portion 210 is inserted into the outer hollow portion 220; and FIG. 10(c) illustrates an insert nut 200 positioned in a final position in which an appropriate caulking step is done. FIGS. 10(a)-(c) illustrate cross-sectional views.

As illustrated in FIG. 10, the to-be-caulked portion can be bent outward in the radial direction of the inner hollow portion.

Unlike the first embodiment, the inner hollow portion 210 of the second embodiment has an outer surface whose diameter is continuously decreased from the upper end to the to-be-caulked portion 2. That is, the inner hollow portion 210 has a shape of an inverted cone 211. Corresponding to the outer surface of the inner hollow portion 210, the inner surface of the outer hollow portion 220 is continuously decreased from the upper end to the lower end. The outer hollow portion 220 has a shape of an inverted cone 221.

The inner hollow portion 210 is inserted into the outer hollow portion 220 to reach a final position. At the final position, the upper end and the lower end of the inner hollow portion 210 correspond to those of the outer hollow portion 220. Firth insertion of the inner hollow portion 210 is restricted by the engagement of the inverted cones 211, 221.

In the second embodiment, the relative movement between the inner hollow portion and the outer hollow portion can be prevented by the inverted cone 211, 221 formed on the inner hollow portion 210 and the outer hollow portion 220. It can be also prevented by the caulking performed at to-be-caulked portion 2.

The second embodiment has a wedge 222 formed on the outer surface of the outer hollow portion 220. The wedge is fixed to the hole formed on the fixed material such as a table board. Namely, unlike the first embodiment, the insert nut of the second embodiment is fitted to a fixed material such as a table board by using the wedge 222.

THIRD EMBODIMENT

Figure 11:
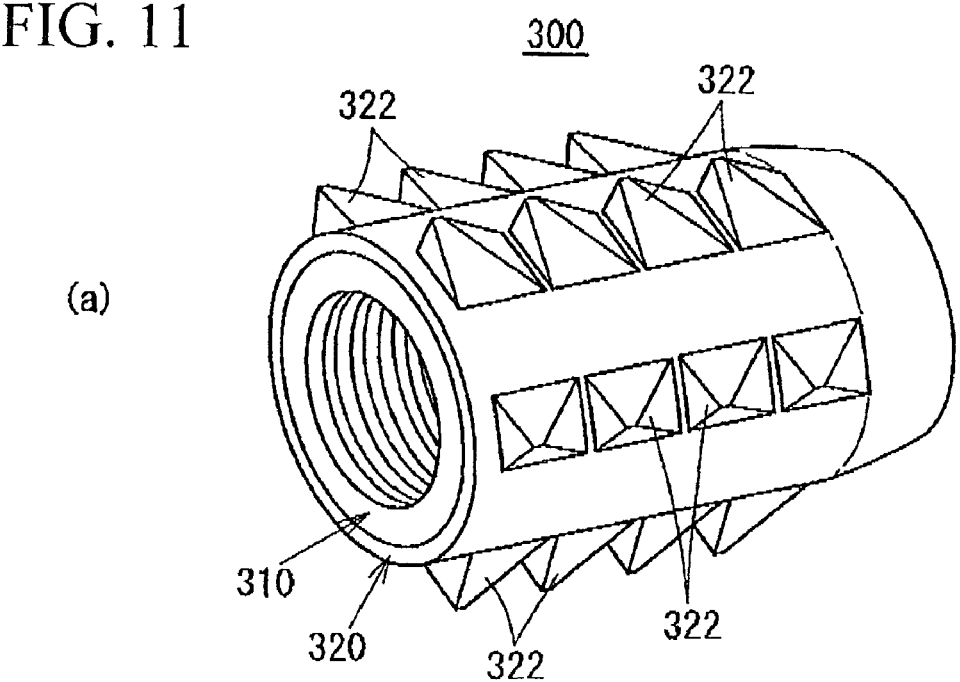
FIG. 11(a) illustrates a perspective view of an insert nut as the third embodiment.
FIG. 11(b) illustrates a cross-sectional view along the axis thereof.
Figure 11:
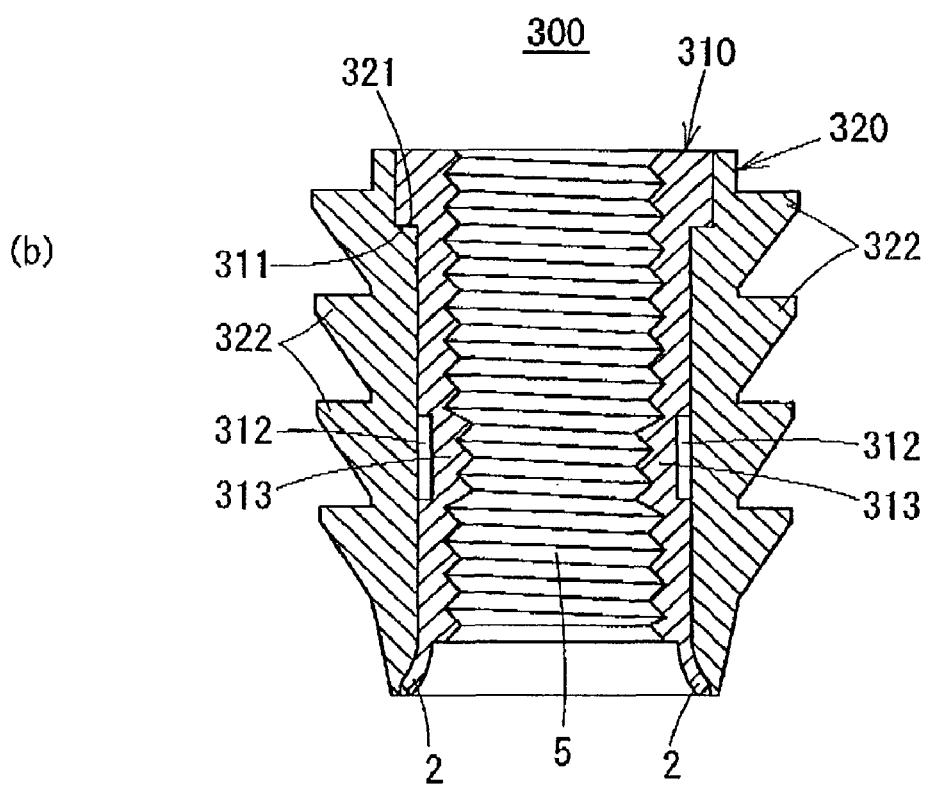
Figure 12:
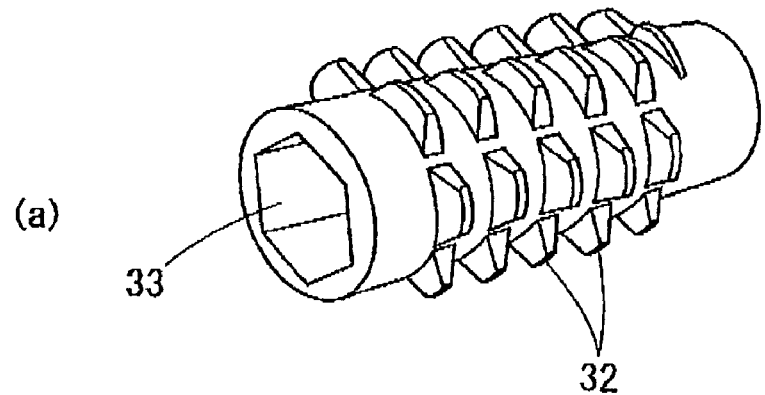
FIG. 12 illustrates a perspective view of a conventional insert nut.
Figure 12:
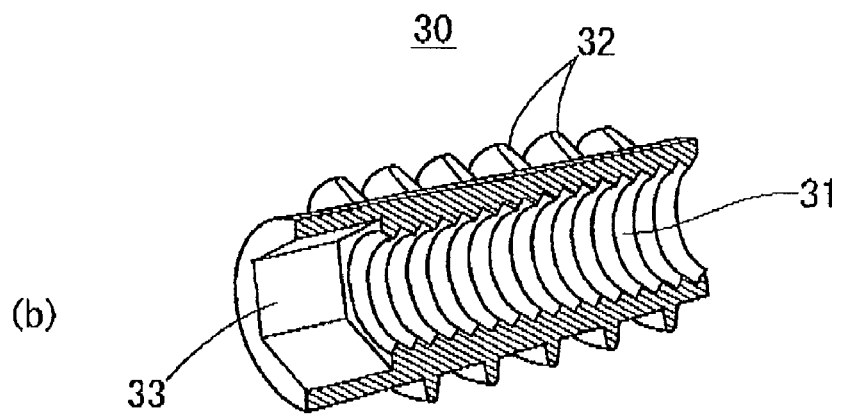

FIG. 11 illustrates an insert nut 300 as a third embodiment of the present invention. FIG. 11(a) illustrates a perspective view, and FIG. 11(b) illustrates a cross-sectional view. The insert nut 300 of the third embodiment has a wedge 322 formed on the outer surface of the outer hollow portion 320.

In the third embodiment, there is provided a to-be-caulked portion 2 formed at the lower end of the inner hollow portion 310. In FIG. 11(b), the to-be-caulked portion 2 is caulked. Before the caulking operation is performed, the to-be-caulked portion 2 is extended downward. See FIGS. 6(a) and 10.

The third embodiment has stepped portions 311, 321 near the upper end. The inner hollow portion 310 is inserted into the outer hollow portion 320 to reach a final portion. At the final position, the upper end of the inner hollow portion corresponds to that of the outer hollow portion. Further insertion of the inner hollow portion 310 is restricted by the stepped portions 311, 321.

Because the inner hollow portion is caulked with the outer hollow portion, the movement of the inner hollow portion is also prevented. Thus, the inner hollow portion 310 and the outer hollow portion 320 are prevented from the relative movement in the axial direction.

Further, the female screw 5 of the inner hollow portion 310 is partially disordered.

The disordering of the female screw 5 may be accomplished by pressing the outer surface of the inner hollow portion 310 by using an appropriate tool so as to form a recess 312. Thus, a disordered portion 313 of the female screw 5 is formed at a position as corresponding to the recess 312.

When a bolt is screwed in the female screw 5 of the inner hollow portion 310, a relatively large amount of force is required to pass the disordered portion 313 so as to deform the thread of the female screw 5. Once the bolt passes the disordered portion 313, the disordered portion 313 locks the engagement therebetween.

The structure of the disordered portion 313 can be applied to the insert nuts 100, 200 shown as the first and second embodiments.

For convenience, the references in the drawings are listed below:

1, 16: stepped portion
2: to-be-caulked portion
3: flange (first hexagonal flange part)
4: hexagonal hole
5: female screw
6: second hexagonal part
7: hollow part
10, 210, 310: inner hollow portion
11: flange
12: projection
13: first hexagonal hole
14: second hexagonal hole
15: round hole
20, 220, 320: outer hollow portion
30: insert nut
100: insert t-nut
200, 300: insert nut as embodiment
211, 221: shape of an inversed cone
311, 321: stepped portion
222, 322: wedge

What is claimed is:

1. An insert nut, comprising:
   an outer hollow portion made of a resin material, having a projection functioning as a male screw or wedge formed on an outer surface thereof; and
   an inner hollow portion made of a metal material, having a female screw formed on an inner surface thereof, the inner hollow portion having an outer surface which is entirely covered by the outer hollow portion,
   wherein the inner hollow portion is press-fined to the outer hollow portion by inserting one end of the inner hollow portion into the outer hollow portion to reach a final position, wherein further insertion of the inner hollow portion is prevented beyond the final position, wherein said one end of the inner hollow portion is caulked with the outer hollow portion.

2. An insert nut according to claim 1, wherein the final position is determined by stepped portions formed on the inner hollow portion and the outer hollow portion, one being engaged with the other.

3. An insert nut according to claim 1, wherein the final position is determined by inverted cone structures formed on the inner hollow portion and the outer hollow portion, one being engaged with the other.

4. An insert nut according to claim 1, wherein the female screw is partially disordered.

5. An insert nut according to claim 1, wherein said one end of the inner hollow portion is caulked with the outer hollow portion by crimping.

* * * * *